(12) United States Patent
Maruiwa

(10) Patent No.: US 11,657,713 B2
(45) Date of Patent: May 23, 2023

(54) MANAGEMENT SYSTEM OF AUTOMATED VALET PARKING LOT

(71) Applicant: TOYOTA JIDOSHA KABUSHIKI KAISHA, Toyota (JP)

(72) Inventor: Nobutsugu Maruiwa, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 292 days.

(21) Appl. No.: 17/158,351

(22) Filed: Jan. 26, 2021

(65) Prior Publication Data

US 2021/0287542 A1   Sep. 16, 2021

(30) Foreign Application Priority Data

Mar. 10, 2020   (JP) .............................. JP2020-041041

(51) Int. Cl.
*G08G 1/14* (2006.01)
*B60W 30/06* (2006.01)
*B60W 60/00* (2020.01)

(52) U.S. Cl.
CPC ............. *G08G 1/146* (2013.01); *B60W 30/06* (2013.01); *B60W 60/001* (2020.02); *G08G 1/149* (2013.01)

(58) Field of Classification Search
CPC ....... B60W 60/001; E04H 6/10; G08G 1/149; G08G 1/142; G01C 21/3679; G01C 21/3626
See application file for complete search history.

(56) References Cited

U.S. PATENT DOCUMENTS

| 2019/0101918 | A1 | 4/2019 | Mukaiyama |
| 2020/0198620 | A1* | 6/2020 | Nakata ............... B60W 60/0053 |
| 2020/0380436 | A1* | 12/2020 | Bonomo ............ G06Q 10/1091 |

FOREIGN PATENT DOCUMENTS

| CN | 107622531 A | 1/2018 |
| JP | 2009-217624 A | 9/2009 |
| JP | 2018-173965 A | 11/2018 |
| JP | 2019-035261 A | 3/2019 |
| JP | 2019067200 A | 4/2019 |
| KR | 20140030707 A | 3/2014 |

OTHER PUBLICATIONS

Translation of reference applicant JP 2009217624 to Toshihiko et al. (Toshi) (Year: 2009).*

* cited by examiner

*Primary Examiner* — Kenneth J Malkowski
(74) *Attorney, Agent, or Firm* — Dickinson Wright, PLLC

(57) ABSTRACT

A management system of an automated valet parking lot according to an example in the present disclosure is a management system of an automated valet parking lot attached to a facility. The management system includes a setting unit for setting a management area for the facility, an authentication unit for performing, when a vehicle is deposited in the automated valet parking lot, usage authentication of the automated valet parking lot with a portable terminal associated with the vehicle, a tracking unit for tracking the position of the portable terminal authenticated for the usage, and a notification unit for notifying the portable terminal of an alarm when the portable terminal is outside the management area.

6 Claims, 5 Drawing Sheets

MANAGEMENT SYSTEM OF AUTOMATED VALET PARKING LOT

CROSS-REFERENCE TO RELATED APPLICATION

The present application claims priority under 35 U.S.C. § 119 to Japanese Patent Application No. 2020-041041, filed Mar. 10, 2020, the contents of which application are incorporated herein by reference in their entirety.

TECHNICAL FIELD

An example in the present disclosure relates to a management system of an automated valet parking lot, and more particularly, to a management system suitable for use in management of an automated valet parking lot which is attached to a facility used by many people.

BACKGROUND

Automated valet parking in which a vehicle is self-propelled in a parking lot is known, for example, as disclosed in JP2019-672001A. In facilities to which people may come by vehicle, such as commercial facilities (such as shopping malls, and amusement facilities), medical facilities (such as hospitals, and clinics), and social education facilities (such as libraries, and art galleries), it is convenient if a parking lot (an automated valet parking lot) compatible the automated valet parking as disclosed in JP2019-672001A.

However, since the automated valet parking lot is convenient, it is expected that even a person who does not use the facility will deposit the vehicle in the automated valet parking lot, and that a person who truly wants to use the facility will not be able to use the automated valet parking lot.

SUMMARY

An embodiment in the present disclosure has been made in view of the above-mentioned problems, and an object thereof is to provide a management system of an automated valet parking lot, which reduces, in a case where the automated valet parking lot is installed at a facility, the use of the automated valet parking lot for purposes other than the use of the facility, and which enables a person who truly wants to use the facility to use the automated valet parking lot.

A management system of an automated valet parking lot according to an example in the present disclosure is a management system of an automated valet parking lot attached to a facility. The management system includes a setting unit for setting a management area for the facility, an authentication unit for performing, when a vehicle is deposited in the automated valet parking lot, usage authentication of the automated valet parking lot with a portable terminal associated with the vehicle, a tracking unit for tracking the position of the portable terminal authenticated for the usage, and a notification unit for notifying the portable terminal of an alarm when the portable terminal is outside the management area.

According to the management system having such a configuration, when a user who has deposited the vehicle in the automated valet parking lot is outside the management area, the management system notifies the portable terminal of the user of the alarm. Thereby, it is possible to psychologically suppress the use of the automated valet parking lot for purposes other than the use of the facility. As a result, the use of the automated valet parking lot for purposes other than the use of the facility is reduced, and a person who truly wants to use the facility can use the automated valet parking lot.

The notification unit may notify the portable terminal of the alarm a plurality of times while the portable terminal is outside the management area. Because, there is a possibility that the person having the portable terminal does not notice the alarm, and the warning effect may be enhanced by repeatedly notifying the alarm.

According to another example in the present disclosure, the management system of the automated valet parking lot may further include a penalty processing unit. The penalty processing unit imposes a penalty for the use of the automated valet parking lot by the vehicle associated with the portable terminal on the condition which a predetermined penalty condition is satisfied when the portable terminal is outside the management area. The predetermined penalty condition may be, for example, that the time during which the portable terminal is outside the management area exceeds a predetermined time, or that the portable terminal is outside the management area even after the last alarm is notified.

According to the management system having the penalty processing unit, since a penalty is actually imposed for the use of the automated valet parking lot for purposes other than the use of the facility. Thereby, the number of people who attempt to improperly use the automated valet parking lot is reduced. Also, the penalty is imposed after waiting for a predetermined penalty condition to be satisfied, rather than imposing a penalty immediately after the portable terminal left the management area. Thereby, it is possible to suppress to impose the penalty on a user who erroneously has left the management area.

The penalty processing unit may change the weight of the penalty in accordance with the time during which the portable terminal is outside the management area. Alternatively, the penalty processing unit may change the weight of the penalty in accordance with the time from the notification of the last alarm to returning of the portable terminal into the management area. In other words, the penalty imposed on the user may be increased as the use time of the automated valet parking lot for purposes other than the original use is longer. Since the penalty becomes heavier as the improper use becomes longer time, even if the automated valet parking lot is used for purposes other than the original use, the use time may be suppressed to a short time.

The penalty processing unit may impose the penalty for the use of the automated valet parking lot by the vehicle associated with the portable terminal when the portable terminal is turned off. When the automated valet parking lot is used, it is necessary to keep the power supply on all the time because it is necessary to track the position of the portable terminal. By imposing the penalty when the power of the portable terminal is turned off, it is possible to hold the user to the rules for using the automated valet parking lot.

The penalty processing unit may, as the penalty, increase the usage fee of the automated valet parking lot of the vehicle associated with the portable terminal. As a financial burden increases, the user will be encouraged to refrain from the improper use of the automatic valet parking lot In this case, the longer the improper use time, the higher the penalty fee may be imposed.

The penalty processing unit may restrict, as the penalty, that the vehicle associated with the portable terminal uses the automated valet parking lot. Since the user wants to avoid the use restriction of the automated valet parking lot, the user will try to refrain from the improper use of automatic valet parking lot.

As described above, the management system of the automated valet parking lot according to the example in the present disclosure, when the user who has deposited the vehicle in the automated valet parking lot is outside the management area, notifies the alarm to the user's portable terminal. Thereby, it is possible to psychologically suppress the use of the automated valet parking lot for purposes other than the use of the facility. As a result, the use of the automated valet parking lot for purposes other than the use of the facility is reduced, and a person who truly wants to use the automated valet parking lot may use the automated valet parking lot.

DESCRIPTION OF EMBODIMENTS

Embodiments in the present disclosure will be described below with reference to the drawings. However, even if the numbers (such as the number, the quantity, the range, or the like) of the each elements are referred in the following embodiments, other examples in the present disclosure are not limited to the number, unless specifically stated or obviously identified in principle. In addition, the structure and the steps described in the embodiments described below are not limited to other examples in the present disclosure unless otherwise specified or obviously identified in principle.

1. Management System of Automated Valet Parking Service

Figure 1:
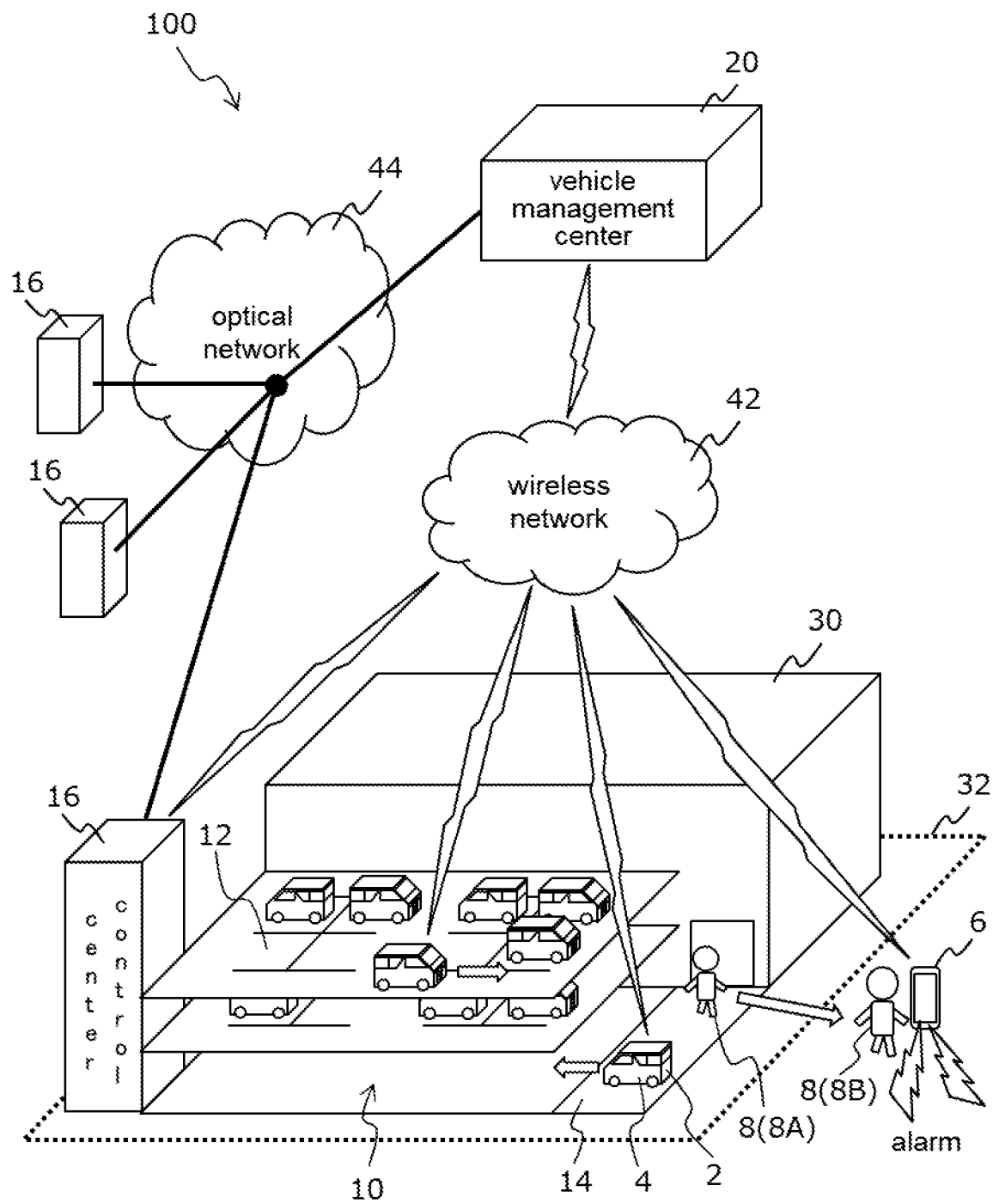
FIG. 1 is a diagram illustrating a configuration of a management system of an automated valet parking service.

FIG. 1 is a diagram illustrating a configuration of a management system of an automated valet parking service. The automated valet parking service according to the present embodiment includes provision of an automated valet parking lot 10 and guidance of a vehicle 2 by autonomous running in the automated valet parking lot 10. The management of the automated valet parking lot 10 is one function of a management system 100 of the automated valet parking service. The management system 100 includes a vehicle system 4 mounted on the vehicle 2, a portable terminal 6 of a user, a control center 16, and a vehicle management center 20, which are connected by networks 42 and 44.

The automated valet parking lot 10 is attached to a facility 30. Each facilities which a user may come by the vehicle 2, such as, commercial facilities (such as, shopping malls, and amusement facilities), medical facilities (such as, hospitals and clinics), and social education facilities (such as, libraries, and art galleries) may be the facility 30. However, a facility, such as, airports, ship ports, and train stations, on which a user of a parking lot is supposed to leave the facility is not included in the facility 30. That is, the condition which a facility corresponds to the facility 30 is that a user can use the automated valet parking lot 10 on the assumption that the user uses the facility.

The vehicle 2 is a vehicle accepting the automated valet parking service. The vehicle 2 is configured to, in the automated valet parking lot 10, automatically travel a route at least between a boarding area 14 and a designated parking space 12 based on various information, and to be automatically parked in the designated parking space 12. Automatic traveling and automatic parking is performed by the vehicle system 4 mounted on the vehicle 2. The vehicle system 4 is connected to the control center 16 and the vehicle management center 20 via a radio network 42, such as, LTE, and 5G. Various methods for the automatic traveling and the automatic parking are known, and in the present embodiment, there is no limitation to the automatic traveling and the automatic parking method. Therefore, a detailed description thereof will be omitted.

The control center 16 is installed in each automated valet parking lot 10. The control center 16 manages the parking infrastructure, such as a camera for monitoring the situation and vehicles in the automated valet parking lot 10, and manages the automatic traveling and the automatic parking of the vehicle 2 in the automated valet parking lot 10. The control center 16 is connected to the vehicle system 4 via a wireless network 42, and is connected to the vehicle management center 20 via, for example, an optical network 44.

The vehicle management center 20 is a core device of the management system 100. The vehicle management center 20 manages the membership information of the user of the automated valet parking lot, and executes various processes necessary for realizing the automated valet parking including reservation and usage authentication of the automated valet parking lot 10. The vehicle management center 20 also functions as a management system of the automated valet parking lot 10. The vehicle management center 20 is connected to the control center 16 via an optical network 44, and is connected to the vehicle system 4 via a wireless network 42. The vehicle management center 20 is also connected to the user's portable terminal 6 via a wireless network 42.

The portable terminal 6 is a terminal capable of wide area wireless communication, such as, LTE, and 5G, or local wireless communication, such as, WiFi (registered trademark, and Bluetouth (registered trademark), and portable by a user. Some examples of the portable terminal 6 include a smart phone and a tablet PC. The portable terminal 6 stores registration information associating the portable terminal 6 with the vehicle 2. By downloading the AVP application, which is a dedicated application, to the portable terminal 6 and activating the AVP application, various functions, such as, reservation for use of the automated valet parking lot 10, automatic entrance in the automated valet parking lot 10, automatic exit from the automated valet parking lot 10, can be used. The portable terminal 6 is connected to the vehicle management center 20 via a wireless network 42.

2. Authentication Procedure for Automated Valet Parking Service

In order for the user to use the automated valet parking service, usage authentication by the management system 100 is required. The procedure for authenticating the use of the automated valet parking service is as follows.

When the user of the facility 30 wants to use the automated valet parking lot 10 attached to the facility 30, the portable terminal 6 requests the vehicle management center 20 to reserve the automated valet parking lot 10 to be used. The reservation request includes, for example, a member number, a desired parking lot, and a desired use date and time. When receiving the reservation request from the portable terminal 6, the vehicle management center 20 performs authentication with reference to the member information registered in the database, issues a key, and distributes the key to the portable terminal 6. The member information includes a telephone number or an address of the portable terminal 6 and a vehicle registration number of the vehicle 2 as well as the member number. After the usage authentication, the vehicle management center 20 distributes the key to the portable terminal 6, and transmits the reservation information to the control center 16 of the automated valet parking lot 10 reserved by the user.

The user checks in the automated valet parking lot 10 to be used using the key distributed from the vehicle management center 20. The control center 16 of the automated valet parking lot 10 collates the reservation information received from the vehicle management center 20 with the member information in the key information received from the portable terminal 6. The control center 16 transmits a key to the vehicle management center 20 when it is determined that the user is the authorized user based on the result of the collation. The vehicle management center 20 performs authentication between the key issued to the user and the key information received from the control center 16. When it is determined that the both are consistent with each other, the vehicle management center 20 passes the operation authority of the vehicle 2 to the control center 16. As a result, the user can use the reserved automated valet parking lot 10.

3. Management System of Automated Valet Parking Lot

The vehicle management center 20 as a management system of the automated valet parking lot 10 also manages appropriate use of the automated valet parking lot 10 by the user. The appropriate use of the automated valet parking lot 10 is the use of the automated valet parking lot 10 for purpose to use the attached facility 30. The use of the automated valet parking lot 10 for purposes other than the use of the facility 30, e.g., use of the automated valet parking lot 10 for a purpose of use of another facility in the neighborhood, is not the appropriate use.

Therefore, the vehicle management center 20 as the management system tracks the position of the user 8 checked in the automated valet parking lot 10. Since the user 8 has the portable terminal 6 which has authenticated for the usage of the automated valet parking lot 10 by the vehicle management center 20, it is possible to track the position of the user 8 by tracking the position of the portable terminal 6. The vehicle management center 20 tracks the position of the portable terminal 6 based on the position information transmitted from the portable terminal 6. In order to detect the position of the portable terminal 6, it is possible to use, if outdoors, GPS and, if indoors, WiFi (registered trademark) of a radio communication device, radio strength, such as, Bluetouth (registered trademark), and UWB (Ultra-Wide Band), and ultrasonic beacons.

The vehicle management center 20 sets a management area 32 for the facility 30. The management area 32 may be arbitrarily set by, for example, a person in charge of the facility 30 or a person in charge of the automated valet parking lot 10. Some examples of the management areas 32 may include within premises of the facility 30 or indoors of the facility 30. The vehicle management center 20 tracks the position of the portable terminal 6 and determines whether the user 8 is within or outside the management area 32. In this specification, as illustrated in FIG. 1, the user 8 in the management area 32 may be referred to as a "user 8A", and the user 8 outside the management area 32 may be referred to as a "user 8B".

The vehicle management center 20 only continuously tracks the position of the user 8A in the management area 32, but also calls attention to the user 8B outside the management area 32. As an attention method, the vehicle management center 20 notifies an alarm to the portable terminal 6 carried by the user 8B. The alarm may be a message or a vibration in addition to a sound. Details of the determination procedure and the alarm when the alarm is notified will be described later.

When the user 8 is outside the management area 32, an alarm is notified to the portable terminal 6 of the user 8 from the vehicle management center 20. Thereby, it is possible to psychologically suppress the use of the automated valet parking lot 10 for purposes other than the use of the facility 30. As a result, the use of the automated valet parking lot 10 for purposes other than the use of the facility 30 is reduced, and a person who truly wants to use the facility 30 can use the automated valet parking lot 10.

Further, the vehicle management center 20 may impose a penalty on the user 8B on the condition which a predetermined penalty condition is satisfied. The penalty herein is a penalty for the use of the vehicle 2 of the user 8B, that is, the use of the automated valet parking lot 10 of the vehicle 2 associated with the portable terminal 6 that the user 8B carries. The penalty includes a financial penalty and a usage restriction penalty. Details of the determination procedure and the penalty when the penalty is imposed will be described later.

By actually imposing the penalty for the use of the automated valet parking lot 10 for purpose other than the use of the facility 30, it is expected that the number of users 8 who attempt to improperly use the automated valet parking lot 10 will decrease. In addition, by imposing the penalty after waiting for a predetermined penalty condition to be satisfied, rather than imposing the penalty immediately when the portable terminal 6 is outside the management area 32, it is possible to suppress the penalty from being imposed on the user 8 who erroneously has left the management area 32.

4. Functions of Each Device Constituting Management System

Figure 2:
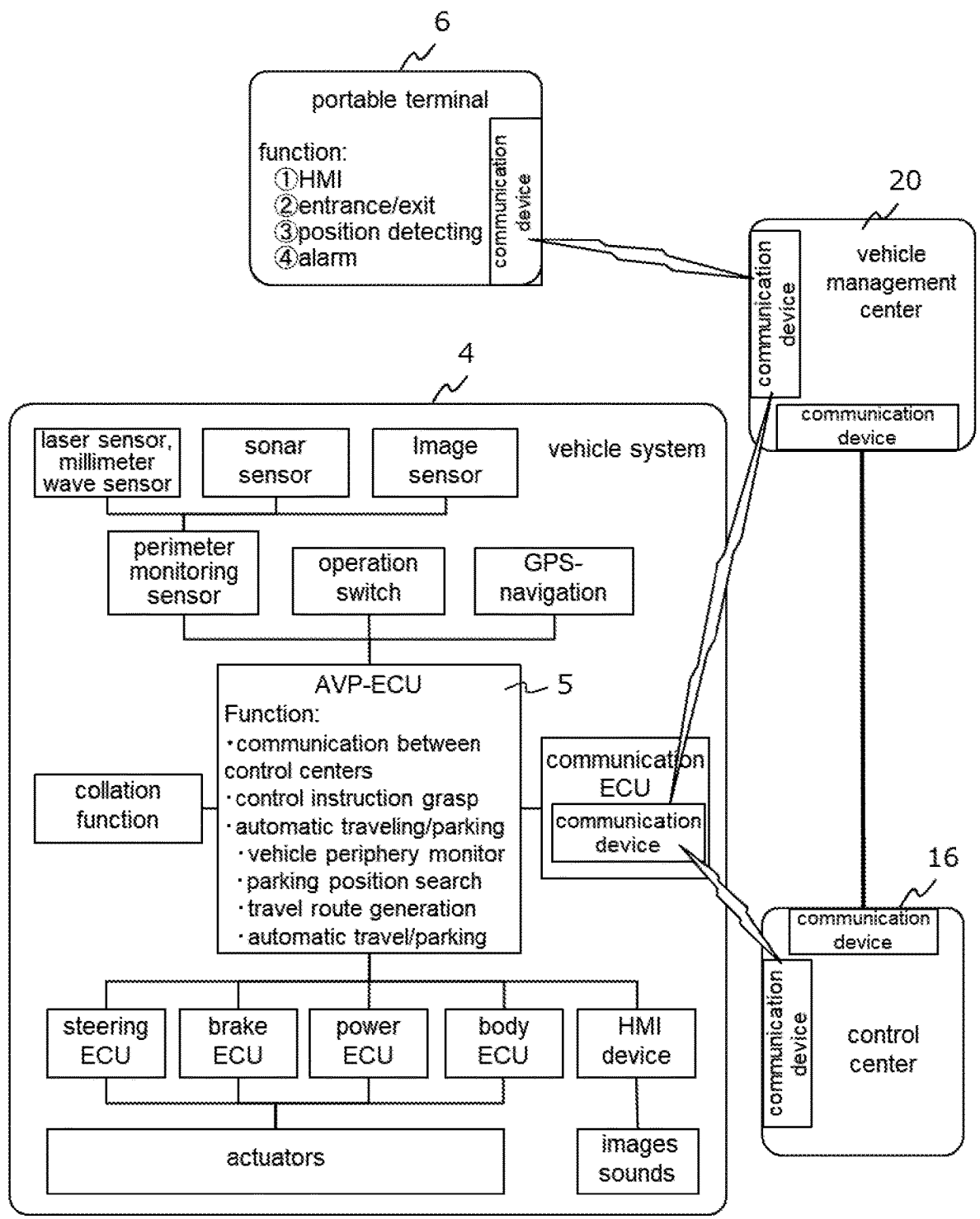
FIG. 2 is a diagram illustrating a list of functions of a vehicle system and a portable terminal.
Figure 3:
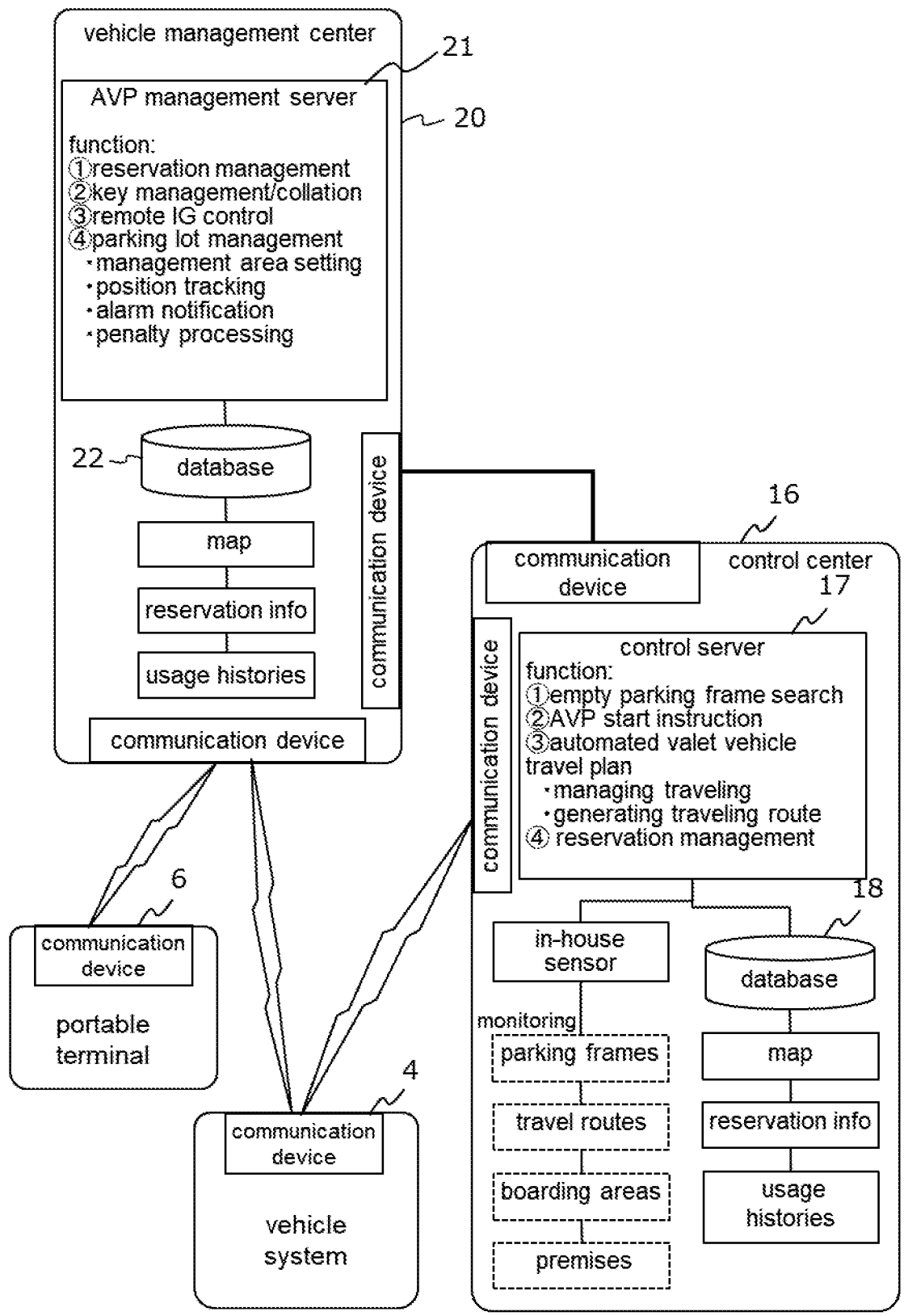
FIG. 3 is a diagram illustrating a list of functions of a vehicle management center and a control center.

FIGS. 2 and 3 illustrate a list of functions of the devices 4, 6, 16, and 20 constituting the management system 100. FIG. 2 is a diagram illustrating a list of functions of the vehicle system 4 and the portable terminal 6. FIG. 3 is a diagram illustrating a list of functions of the vehicle management center 20 and the control center 16. Hereinafter, the functions of the devices 4, 6, 16, and 20 will be described based on the lists illustrated in FIGS. 2 and 3.

The vehicle system 4 is configured to include a plurality of sensors, a plurality of ECUs (Electronic Control Unit), actuators, and other devices. The plurality of the sensors include a vehicle perimeter monitoring sensor for automatic operation necessary to enjoy the automated valet parking services. The vehicle perimeter monitoring sensor may be a laser sensor, a millimeter wave sensor, a sonar sensor, and an image sensor. The plurality of ECUs include an AVP-ECUS which is an ECU for automated valet parking. The AVP-ECU 5 acquires the necessary information for automatic traveling and automatic parking from the vehicle perimeter monitoring sensor, an operation switch, and a GPS-navigation. In addition, the AVP-ECUS exchanges information for automated valet parking with the communication ECUs that control a communication devices. The AVP-ECUS outputs operational signals to a steering ECU, a brake ECU, a power manipulator ECU, and a body ECU which control the actuators of the vehicle 2 in order to automatically drive and automatically park the vehicle 2. In addition, the AVP-ECUS controls the HMI device to provide the driver with information related to the automated valet parking using images and sounds.

The AVP-ECU 5 has a communication function between a control center, a control instruction grasp function, and an automatic traveling/parking function. The communication function between a control centers is a function to communicate with the control center 16. The control instruction grasp function is a function to grasp instructions from the control center 16. The automatic traveling/parking function is a function to automatically travel or park the vehicle 2 in the automated valet parking lot 10. More specifically, the automatic traveling/parking function includes a function of monitoring the vehicle periphery, a function of searching the parking position, a function of generating a traveling route, and a function of automatic traveling and parking.

The portable terminal 6 has an HMI function, an entrance/exit function, a position detecting function, and an alarm function. The HMI function accepts operations from the user and displays information to the user. The reservation for use of the automated valet parking lot 10 is made by using the HMI function. The entrance/exit function is a function to request to the vehicle management center 20 for the automatic entrance of the vehicle 2 to the automated valet parking lot 10, and the automatic exit of the vehicle 2 from the automated valet parking lot 10. The position detecting function is a function to detect the current position of the portable terminal 6 using means such as GPS and to transmit the position information to the vehicle management center 20. The alarm function is a function to notify an alarm to the user in accordance with the instruction from the vehicle management center 20.

The control center 16 includes a control server 17. Monitoring information from an in-house sensor is input to the control server 17. The indoors sensor monitors all parking frames, travel routes, boarding areas, and the premises of the automated valet parking lot 10. The control server also manages a database 18. In the database 18, information for the automated valet parking service provided in the automated valet parking lot 10 managed by the control center 16 is registered. Specifically, at least a parking lot map of the automated valet parking lot 10, reservation information of the automated valet parking lot 10, and a usage history of each member of the automated valet parking lot 10 are registered in the database 18.

The control server 17 includes an empty parking frame search function, an AVP start instruction function, an automated valet vehicle travel plan function, and a reservation management function. The empty parking frame search function is a function to search an empty parking frame in the automated valet parking lot 10. The AVP start instruction function is a function to instruct the vehicle 2 to start automated valet parking. The automated valet vehicle travel plan function is a function to make a traveling plan of the vehicle 2 in the automated valet parking lot 10, and, more specifically, includes a function of managing the traveling of each vehicle and a function of generating a traveling route for each vehicle. The reservation management function is a function to manage the reservation of the automated valet parking lot 10 from the user.

The vehicle management center 20 includes an AVP management server 21 which manages automated valet parking services. The AVP management server 21 manages a database 22. While the database 18 managed by the control server 17 is an individual database for each automated valet parking lot 10, the database 22 managed by the AVP management server 21 is a database related to all automated valet parking lots 10. In the database 22, at least a parking lot map of all the automated valet parking lots 10, reservation information of all the automated valet parking lots 10, and usage histories for respective members of all the automated valet parking lots 10 are registered. In the database 22, the member information of the members registered with the automated valet parking is also registered.

The AVP management server 21 includes a reservation management function, a key management/collation function, a remote IG control function, and a parking lot management function. The reservation management function is a function to manage the reservation of the automated valet parking lot 10 from the user. The key management/collation function is a function for the usage authentication necessary for the user to use the automated valet parking service. The remote IG control function is a function to automatically start the vehicle 2 by remote control. The parking lot management function is a function to manage the appropriate use of the automated valet parking lot 10 by the user. More specifically, the parking lot management function includes a management area setting function to set the management area 32 for the facility 30, a position tracking function to track the position of the portable terminal 6 authenticated for the usage with the vehicle management center 20, an alarm notification function to notify the portable terminal 6 of an alarm when the portable terminal 6 is outside the management area 32, and a penalty processing function to impose the penalty on the user who is outside the management area 32.

Among the parking lot management function provided in the AVP management server 21, the alarm notification function and the penalty processing function will be described in more detail below.

5. Alarm Notification Function

Figure 4:
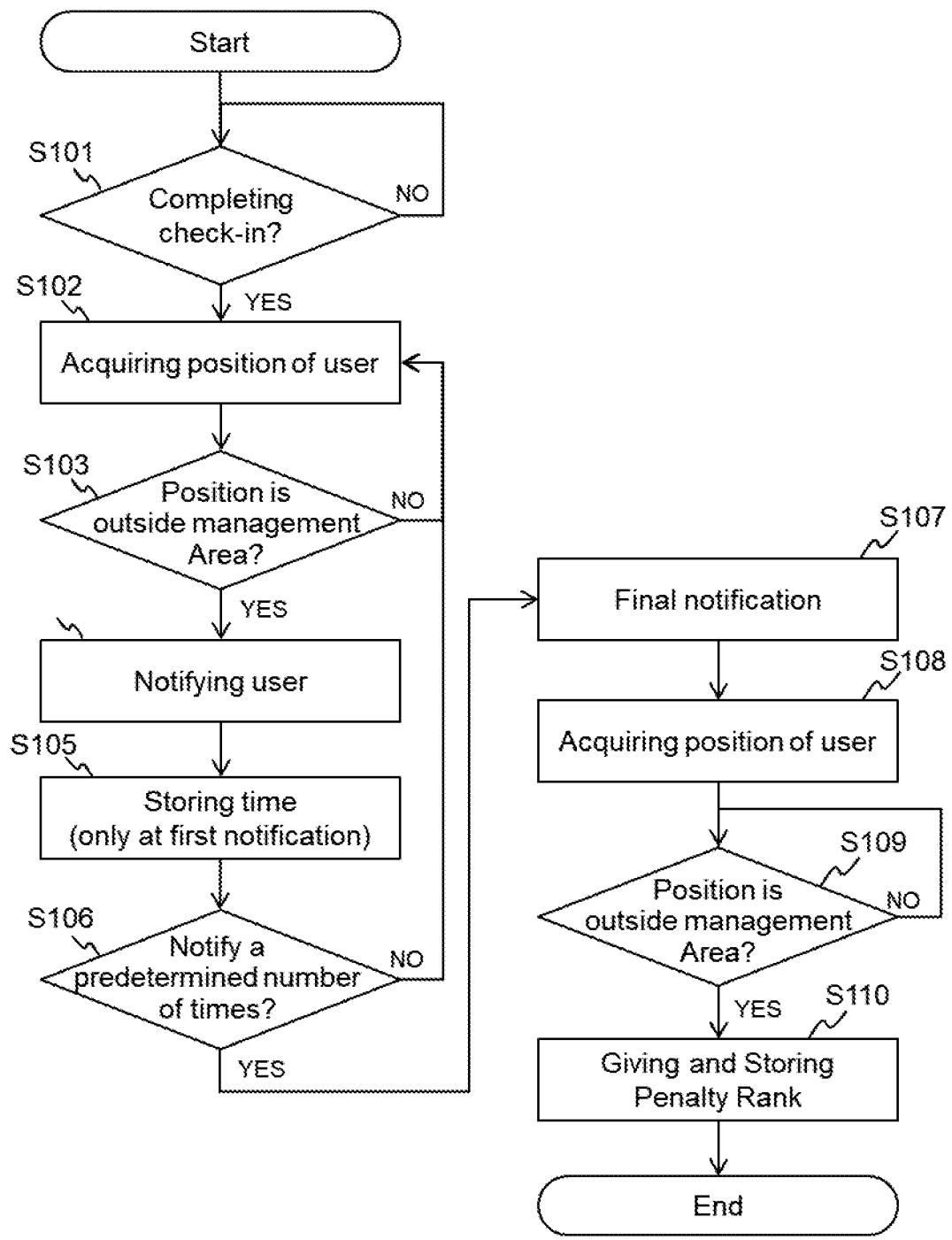
FIG. 4 is a flowchart illustrating a procedure of determination when notifying an alarm.

FIG. 4 is a flowchart illustrating a procedure of a decision on notification of the alarm by the AVP management server 21 of the vehicle management center 20. The alarm notification function of the AVP management server 21 will be described in detail with reference to FIG. 4.

The procedure illustrated in the flowchart starts when the user makes the reservation of the automated valet parking lot 10 to the AVP management server 21. In step S101, the AVP-management server 21 determines whether the check-in of the vehicle 2 to the automated valet parking lot 10 has been completed. When the check-in is completed, the process proceeds to step S102.

In step S102, the AVP management server 21 acquires the position of the user 8 based on the position information transmitted from the portable terminal 6 carried by the user 8. Next, in step S103, the AVP management server 21 determines whether or not the position of the user 8 acquired in step S102 is outside the management area 32 of the facility 30. The AVP-management server 21 continues to track the position of the user 8 (8A) in the management area 32 without notifying of the alarm. When the position of the user 8 acquired in step S102 is outside the management area 32 of the facility 30, the process proceeds to step S104.

In step 104, the AVP management server 21 notifies the user 8 of the alarm by sounds, by messages, by vibrations, or by a combination thereof to the user 8 who is outside the management area 32. Further, in the step S105, only at the time of the first notification, the AVP management server 21 stores the time at which the notification was performed in the database 22. Next, in the stepped S106, the AVP-management server 21 determines whether or not an alarm has been notified to the user 8 outside the management area 32 a predetermined number of times. While the user 8 stays outside the management area 32, the AVP management server 21 notifies of the alarm at regular intervals, for example, at intervals of 5 minutes or 10 minutes.

In the present embodiment, the number of the alarm notifications is reset when the user 8 who is outside the management area 32 returns to the management area 32. However, while the user 8 is using the automated valet parking lot 10, the number of the notifications may be continuously counted. That is, even when the user 8 who is outside the management area 32 returns to the management area 32, the number of the notifications is stored without being reset, and when the user 8 is outside the management area 32 again, the count may be resumed from the stored number of the notifications.

When the alarm is notified a predetermined number of times or more, the process proceeds to step S107. In step S107, the AVP management server 21 notifies the user 8 of the final alarm. The final notification is notified, for example, 30 minutes after the first notification. After the final notification, the process proceeds to step S108.

In step S108, the AVP management server 21 acquires the position of the user 8 based on the position information transmitted from the portable terminal 6 carried by the user 8. Next, in step S109, the AVP management server 21 determines whether or not the position of the user 8 acquired in step S108 is outside the management area 32. If the user 8 returns to the management area 32 by the final notification, the AVP management server 21 suspends the process of the step S110. However, when the user 8 remains outside the management area 32 even after the final notification, the process proceeds to step S110. In the step S110, the AVP management server 21 gives the user 8 a rank according to the penalty, and stores the rank in the database 22 in association with the member information of the user 8.

6. Penalty Processing Function

Figure 5:
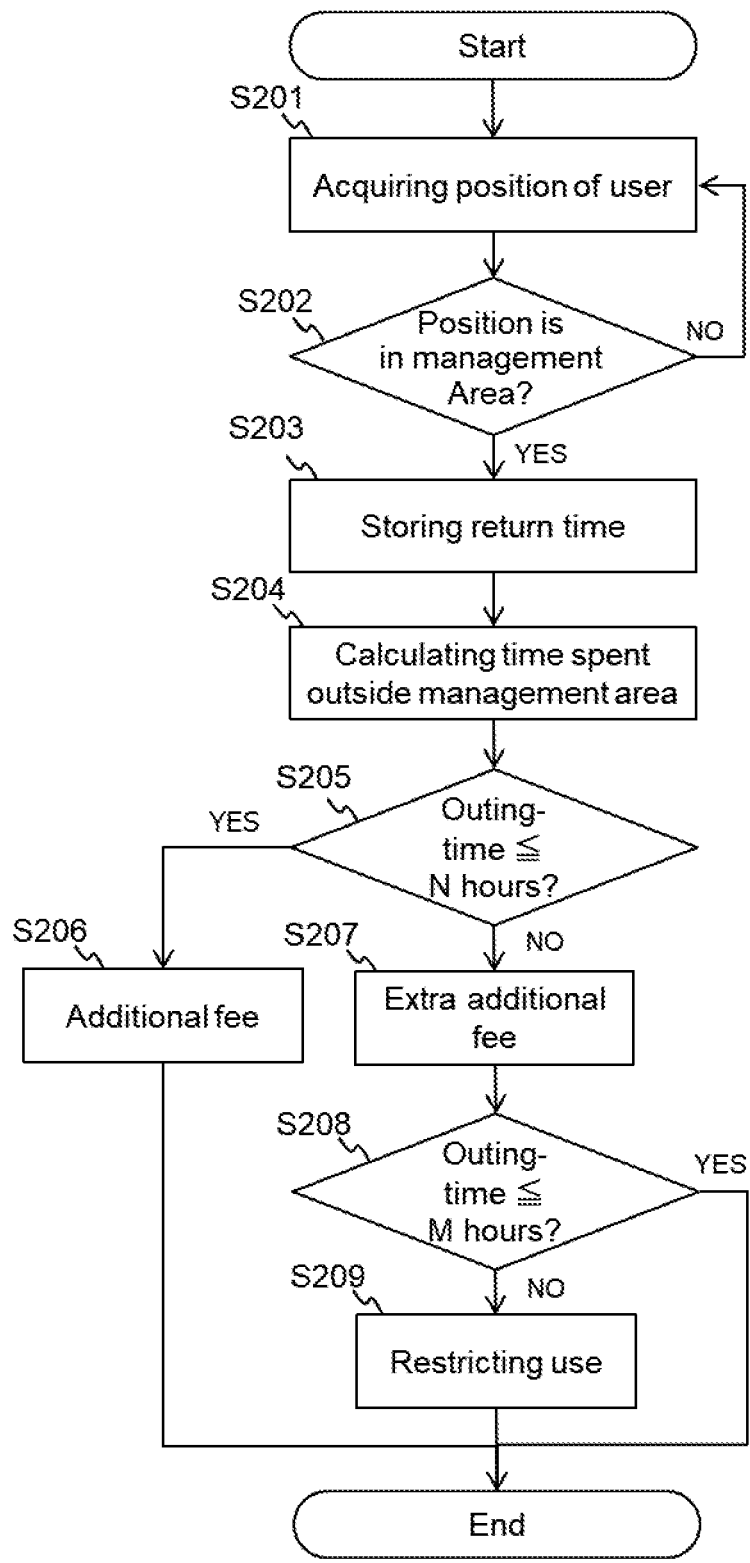
FIG. 5 is a flowchart illustrating a procedure of determination when imposing a penalty.

FIG. 5 is a flowchart illustrating a procedure of decision on imposing the penalty by the AVP management server 21 of the vehicle management center 20. The procedures of this flowchart show in detail the penalty ranking process performed in step S110 in the flowchart of FIG. 4. Hereinafter, the penalty processing function of the AVP management server 21 will be described with reference to FIG. 5.

The procedure illustrated in the flowchart of FIG. 5 is started when it is determined that the user 8 remains outside the management area 32 even after the final notification. Notifying the alarm the predetermined number of times and performing the final notification corresponds to the predetermined penalty condition described above.

In step S201, the AVP management server 21 acquires the position of the user 8 based on the position information transmitted from the portable terminal 6 owned by the user 8. Next, in step S202, the AVP management server 21 determines whether or not the position of the user 8 acquired in step S201 is in the management area 32 of the facility 30. The AVP management server 21 continues to track the position of the user 8 who remains outside the management area 32. On the other hand, when the user 8 returns to the management area 32, the process proceeds to step S203.

In a stepped S203, the AVP administration server 21 stores the time when the user 8 has returned into the management area 32 in the database 22. In step S204, the AVP management server 21 calculates the difference between the time saved in step S105 and the time saved in step S204, that is, the outing-time the user 8 has been outside the management area 32. Then, in step S205, the AVP management server 21 determines whether or not the outing-time is equal to or less than a predetermined N hours. N hours is, for example, 1 hour.

When the outing-time is equal to or less than N hours, the process proceeds to step S206. In step S206, the AVP management server 21 imposes the penalty on the user 8 for adding an additional fee to the original usage fee of the automated valet parking lot 10. The additional fee is, for example, an amount of 50% of the original usage fee. The AVP management server 21 associates the additional fee with the member information of the user 8 and stores the additional fee in the database 22, and charges the additional fee together with the original usage fee at the time of settlement. As a financial burden increases, the user 8 will be encouraged to refrain from the improper use of the automatic valet parking lot 10.

On the other hand, when the outing-time the user 8 has been outside the management area 32 exceeds N hours, the process proceeds to step S207. In step S207, the AVP management server 21 imposes the penalty on the user 8 for adding an extra additional fee to the original usage fee of the automated valet parking lot 10. The extra additional fee is, for example, 100% of the original usage fee. The longer the outing-time from the management area 32, the larger the extra additional fee may be. The AVP management server 21 stores the extra additional fee in the database 22 in association with the member information of the user 8, and charges the extra additional fee together with the original usage fee at the time of settlement.

When the outing-time of the user 8 from the management area 32 exceeds N hours, the process further proceeds to step S208. In step S208, the AVP management server 21 determines whether or not the outing-time of the user 8 from the management area 32 is equal to or less than a predetermined M hours. The M hours is longer than N hours, for example, 24 hours.

When the outing-time of the user 8 from the management area 32 exceeds M hours, the procedure proceeds to the step S209. In step S209, the AVP management server 21 imposes the penalty for restricting the use of the automated valet parking lot 10 on the user 8. Specific examples of the use restriction as the penalty include increase in the usage rate of the automated valet parking lot 10, prohibiting the use of the automated valet parking lot 10, and the like. Up to the second penalty, the usage rate may be raised, and use may be prohibited from the third penalty.

The AVP management server 21 associates the penalty rank of the use restriction with the member information of the user 8 and stores it in the database 22, notifies the penalty information to the control center 16 of the automated valet parking lot 10 together with the reservation information at the next reservation, and imposes the usage restriction corresponding to the penalty rank on the user 8. Since the user 8 wants to avoid the use restriction of the automated valet parking lot 10, the user will try to refrain from the improper use of automatic valet parking lot 10.

The use restriction as the penalty may be applied to each automated valet parking lot 10 improperly used by the user 8. However, the AVP management server 21 may restrict the use of all the automated valet parking lots 10 under the management of the AVP management server 21 when the user 8 improperly uses one automated valet parking lot 10. Since the user is not able to receive the automated valet parking service in all the automated valet parking lots 10, it is possible to let the user more strongly preserve the appropriate use of the automated valet parking lot 10.

Incidentally, when using the automated valet parking lot 10, it is required that the power is always turned on in order to track the position of the portable terminal 6. Nevertheless, when the power of the portable terminal 6 is turned off, it is presumed that the user 8 intentionally turns off the power. In such a case, a penalty may be imposed on the user 8 who owns the portable terminal 6 powered off, that is, for the use of the automated valet parking lot 10 of the vehicle 2 associated with the portable terminal 6. By imposing the penalty for the power-off of the portable terminal 6, it is possible to let the user 8 observe the rules for using the automated valet parking lot 10.

7. Other

As one aspect in the present disclosure, the AVP management server 21 of the vehicle management center 20 in the management system 100 may be the "management system". Then, as another aspect in the present disclosure, the "setting unit" is realized by the AVP management server 21 executing the management area setting function, the "authentication unit" is realized by executing the key management/collation function, the "tracking unit" is realized by executing the position tracking function, the "notification unit" is realized by executing the alarm notification function, and the "penalty processing unit" is realized by executing the penalty processing function.

As another aspect in the present disclosure, the function as the "management system" may be transferred to the control server 17 of the control center 16. That is, instead of managing all the automated valet parking lots 10 by the vehicle management center 20, each control center 16 system may be configured to manage each automated valet parking lot 10.

What is claimed is:

1. A management system of an automated valet parking lot attached to a facility comprising:
   a processor and a memory storing computer executable instructions that when executed by the processor cause the processor to set a management area for the facility;
   perform usage authentication of the automatic valet parking lot with a portable terminal associated with a vehicle when the vehicle is deposited in the automated valet parking lot;
   track a position of the portable terminal that performed the usage authentication;
   detect that the portable terminal is outside the management area;
   notify the portable terminal of an alarm when the portable terminal is detected outside the management area;
   impose a penalty for a use of the automatic valet parking lot by the vehicle associated with the portable terminal on condition which a penalty condition is satisfied when the portable terminal is outside the management area;
   wherein the penalty condition is that the portable terminal is outside the management area even after the last alarm is notified; and
   wherein the memory further stores instructions that cause the processor to change the weight of the penalty in accordance with the time during which the portable terminal is outside the management area after the last alarm is notified.

2. The management system of the automated valet parking lot according to claim 1, wherein the instructions further cause the processor to notify the portable terminal of the alarm a plurality of times while the portable terminal is outside the management area.

3. The management system of the automated valet parking lot according to claim 1, wherein the penalty condition is that a time during which the portable terminal is outside the management area exceeds a predetermined time.

4. The management system of the automated valet parking lot according to claim 1, wherein the instructions further cause the processor to detect that the portable terminal is turned off, and to impose the penalty for the use of the automatic valet parking lot by the vehicle associated with the portable terminal when the portable terminal is detected to be turned off.

5. The management system of the automated valet parking lot according to claim 1, wherein the instructions further cause the processor to increase the usage fee of the automatic valet parking lot of the vehicle associated with the portable terminal.

6. The management system of the automated valet parking lot according claim 1, wherein the instructions further cause the processor to restrict the use of the automatic valet parking lot by the vehicle associated with the portable terminal.

* * * * *